(12) United States Patent
Myers

(10) Patent No.: US 11,553,709 B2
(45) Date of Patent: Jan. 17, 2023

(54) GAS REMOVAL DEVICE FOR CRYOGENIC FREEZING BAGS

(71) Applicant: Mayo Foundation for Medical Education and Research, Rochester, MN (US)

(72) Inventor: Lester W. Myers, El Mirage, AZ (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 17/556,672

(22) Filed: Dec. 20, 2021

(65) Prior Publication Data

US 2022/0110316 A1    Apr. 14, 2022

Related U.S. Application Data

(63) Continuation of application No. 16/518,244, filed on Jul. 22, 2019, now Pat. No. 11,330,814.

(60) Provisional application No. 62/702,658, filed on Jul. 24, 2018.

(51) Int. Cl.
*A01N 1/02*     (2006.01)
*B65D 81/18*    (2006.01)
*A61J 1/10*     (2006.01)

(52) U.S. Cl.
CPC .......... *A01N 1/0257* (2013.01); *B65D 81/18* (2013.01); *A01N 1/0242* (2013.01); *A01N 1/0263* (2013.01); *A61J 1/10* (2013.01)

(58) Field of Classification Search
CPC .. A01N 1/0257; A01N 1/0263; A01N 1/0242; B65D 81/18; A61J 1/10
See application file for complete search history.

(56) References Cited

U.S. PATENT DOCUMENTS

| | | |
|---|---|---|
| 3,369,550 A | 2/1968 | Armao |
| 3,503,397 A | 3/1970 | Fogarty et al. |
| 4,928,829 A | 5/1990 | Di Bernardo |
| 5,352,323 A | 10/1994 | Chi |
| 6,228,104 B1 | 5/2001 | Fogarty et al. |
| 8,740,933 B2 | 6/2014 | Anderson |
| 2005/0029152 A1 | 2/2005 | Brakes et al. |
| 2005/0205455 A1 | 9/2005 | Harrison |
| 2011/0287534 A1 | 11/2011 | Rowley et al. |
| 2020/0029554 A1 | 1/2020 | Myers |

OTHER PUBLICATIONS decotechent.com [online], "Willet Placenta Praevia Forceps T-shaped 19cm," retrieved from URL <https://decotechent.com/willet-placenta-praevia-forceps-t-shaped-19cm.html>, on Mar. 24, 2020, 1 page.

*Primary Examiner* — Lionel Nouketcha
(74) *Attorney, Agent, or Firm* — Fish & Richardson P.C.

(57) ABSTRACT

This document relates to methods and materials for improving the removal of gas from cryogenic freezing bags. For example, this document describes methods and devices for restricting air paths within the cryogenic freezing bag.

20 Claims, 6 Drawing Sheets

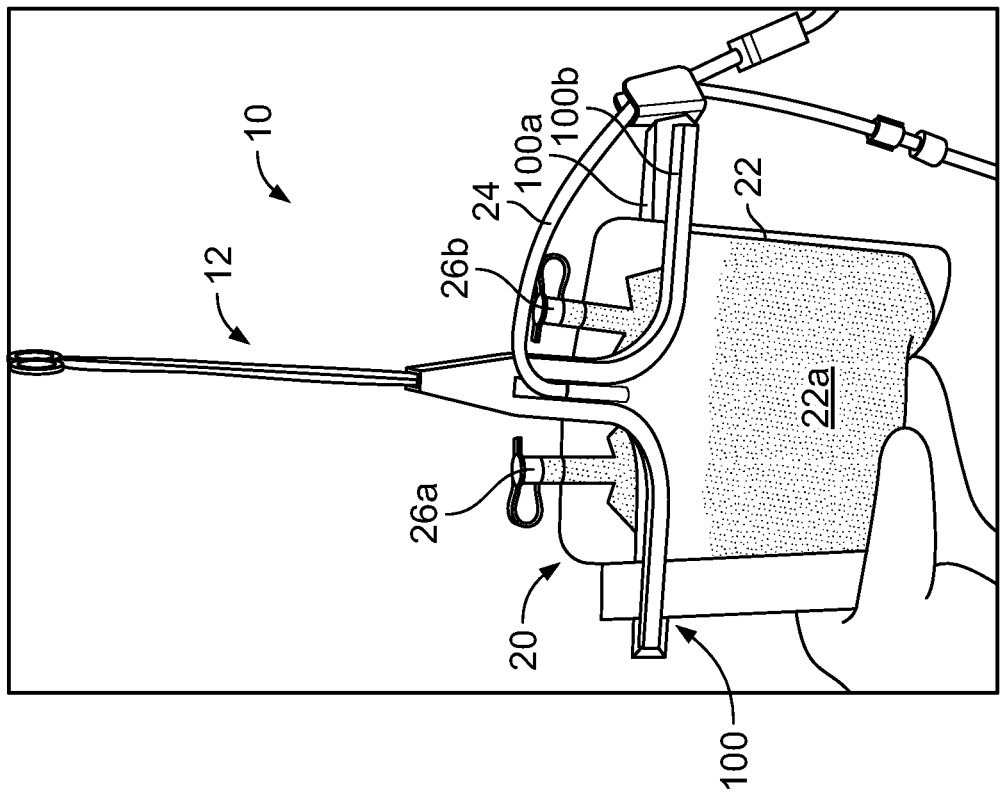
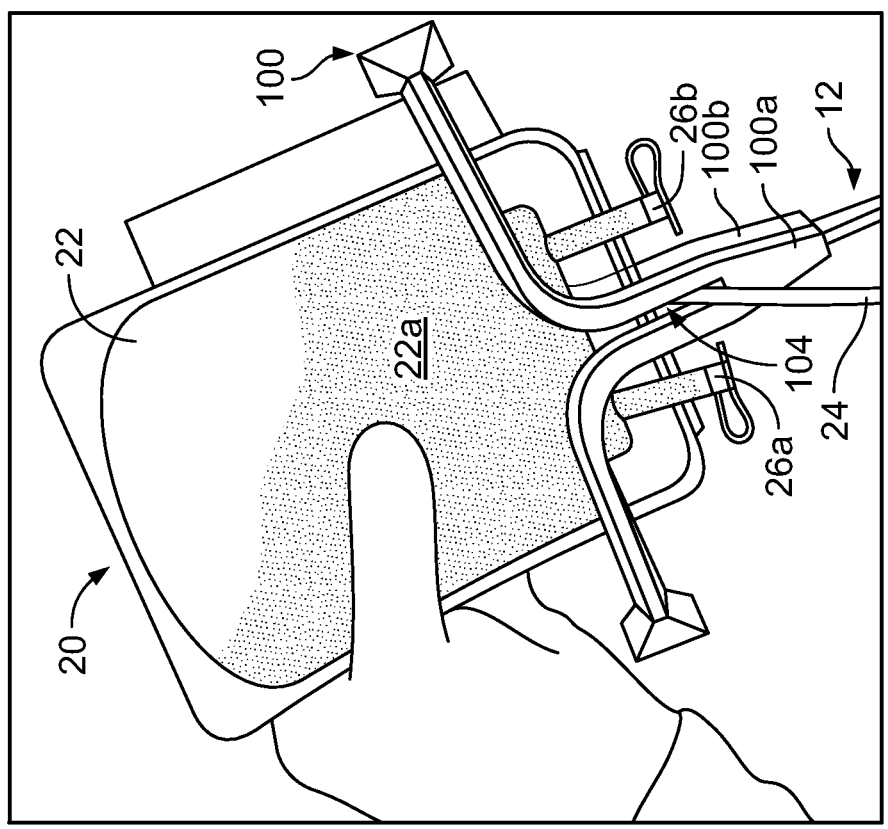

GAS REMOVAL DEVICE FOR CRYOGENIC FREEZING BAGS

CROSS-REFERENCE TO RELATED APPLICATIONS

This application is a continuation of U.S. Utility application Ser. No. 16/518,244, filed Jul. 22, 2019, which claims the benefit of U.S. Provisional Application Ser. No. 62/702,658, filed Jul. 24, 2018. The disclosures of the prior applications are considered part of (and are incorporated by reference in) the disclosure of this application.

BACKGROUND

1. Technical Field

This document relates to methods and materials for improving the removal of gas from cryogenic freezing bags. For example, this document relates to methods and devices for restricting air paths within the cryogenic freezing bag.

2. Background Information

Cryogenic freezing bags can be used for cryo-preservation and/or cryo-conservation, which is a process where organelles, cells, tissues, extracellular matrix, organs or any other biological constructs susceptible to damage caused by unregulated chemical kinetics are preserved by cooling to very low temperatures (e.g., −80° C. using solid carbon dioxide or −196° C. using liquid nitrogen). Cryogenic freezing bags allow for the storage, preservation, and transfers of cells and/or tissues when using cryo-preservation and/or cryo-conservation.

Often when using cryo-preservation and/or cryo-conservation, a cryoprotectant is used. A cryoprotectant is a substance used to protect biological tissue from damage when frozen.

SUMMARY

This document relates to methods and materials for improving the removal of gas from cryogenic freezing bags. For example, this document describes methods and devices for restricting air paths within the cryogenic freezing bag.

In one aspect, this disclosure is directed to a clamping device for removing gas from a cryogenic freezing bag. The clamping device can include a first clamping element, and a second clamping element. The first clamping element can include a first coupling portion defining a first handle portion at a first proximal portion, a first side arm extending from a first distal portion of the first coupling portion in a first direction, wherein the first side arm defines a first recess, and a second side arm extending from the first distal portion the first coupling portion in a second direction different from the first direction, wherein the second side arm defines a first protrusion. The second clamping element can include a second coupling portion defining a second handle portion at a second proximal portion, a third side arm extending from a second distal portion of the second coupling portion in a third direction, wherein the third side arm defines a second protrusion, and a fourth side arm extending from the second distal portion the second coupling portion in a fourth direction different from the third direction, wherein the fourth side arm defines a second recess. The first clamping element and the second clamping element can be pivotally coupled along the first coupling portion between the first proximal portion and the first distal portion and the second coupling portion between the second proximal portion and the second distal portion, such that movement of the first handle portion towards the second handle portion causes mating of the first protrusion with the second recess and the second protrusion with the first recess.

In some cases, the first coupling portion can define a first central opening extending between the first side arm and the second side arm, and the second coupling portion can define a second central opening extending between the third side arm and the fourth side arm, such that the first central opening and the second central opening can receive a tube of the cryogenic freezing bag. In some cases, the clamping device further includes a locking mechanism to lock the first clamping element and the second clamping element together. In some cases, the first recess and the second protrusion can be complementary of one another, and the second recess and the first protrusion can be complementary of one another. In some cases, a first angle between the first direction and the second direction can be substantially similar to a second angle between the third direction and the fourth direction. In some cases, the first recess can extend along a first longitudinal axis of the first side arm, the first protrusion can extend along a second longitudinal axis of the second side arm, the second protrusion can extend along a third longitudinal axis of the third side arm, and the second recess can extend along a fourth longitudinal axis of the fourth side arm.

In another aspect, this disclosure is directed to a clamp element for a hemostat for removing gas from a cryogenic freezing bag. The clamp element can include a coupling portion configured to be coupled to the hemostat, a first side arm extending from the coupling portion in a first direction, wherein the first side arm defines a recess, and a second side arm extending from the coupling portion in a second direction different from the first direction, wherein the second side arm comprises a protrusion.

In some cases, the coupling portion can define an aperture that can couple to the hemostat. In some cases, the aperture can be at an angle offset from a longitudinal axis of the coupling portion. In some cases, the coupling portion can define a central opening extending between the first side arm and the second side arm, the central opening configured to receive a tube of the cryogenic freezing bag. In some cases, the clamping element can include a locking mechanism to lock the clamp element to a second clamp element. In some cases, the recess and the protrusion can be complementary of one another, such that the recess could receive the protrusion. In some cases, an angle between the first direction and the second direction can be about 110 degrees to about 180 degrees. In some cases, the recess can extend along a longitudinal axis of the first side arm, and the protrusion can extend along a longitudinal axis of the second side arm.

In yet another aspect, this disclosure is directed to a method of removing g gas from a cryogenic freezing bag. The method can include clamping a clamping device on the cryogenic freezing bag, the clamping device comprising a first clamping element and a second clamping element, and removing gas from the cryogenic freezing bag.

In some cases, the method can include attaching the first clamping element to a first tip of a hemostat, and attaching the second clamping element to a second tip of the hemostat. In some cases, each of the first clamping element and the second clamping element can include a coupling portion configured to be coupled to the hemostat, a first side arm extending from the coupling portion in a first direction, where the first side arm defines a recess, and a second side arm extending from the coupling portion in a second direction different from the first direction, where the second side arm comprises a protrusion. In some cases, clamping the clamping device on the cryogenic freezing bag can include sealing a first opening of the cryogenic freezing bag. In some cases, the first opening can be a spike port of the cryogenic freezing bag. In some cases, the method can include locking a locking mechanism of the clamping device.

Particular embodiments of the subject matter described in this document can be implemented to realize one or more of the following advantages.

As a result of a toxicity of a cryoprotectant mixture which contains Dimethyl Sulfoxide (DMSO), and an attempt to preserve cell viability, devices and methods described herein can reduce the time between the addition of cryoprotectant to the cells and the time the product is placed in an ultra-cold freezer. The devices and methods described herein can reduce bag manipulation time and therefore increase efficiency and productivity of a technologist. The devices and method described herein can reduce physical stresses and discomfort for the processing technologist. The cell viability also is increased, leading to higher quality of products for patients. Accordingly, patient satisfaction is increased while patient stress is decreased. An advantage for payers (e.g., insurance payers) is increased reliability and decreases in payout due to higher quality products.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods and examples are illustrative only and not intended to be limiting.

The details of one or more embodiments of the invention are set forth in the accompanying drawings and the description below. Other features, objects, and advantages of the invention will be apparent from the description, drawings, and from the claims.

DESCRIPTION OF DRAWINGS

FIG. 10A-10D show a method of using a clamping device with a cryogenic freezing bag, in accordance with some embodiments provided herein.

Like reference numbers represent corresponding parts throughout.

DETAILED DESCRIPTION

This document relates to methods and materials for improving the removal of gas from cryogenic freezing bags. For example, this document describes methods and devices for restricting air paths within the cryogenic freezing bag.

When processing hematopoietic progenitor cells (HPC) collections, apheresis HPC(A), or bone marrow HPC(M), it is important to remove any air that may be trapped in the cryogenic freezing bag after the final product has been added to the bag, and before cryopreservation of the final product. It is very important to work methodically and efficiently after mixing the blood product with the cryoprotectant and the mixture is put into a cryogenic freezing bag. The cryoprotectant mixture can contain Dimethyl sulfoxide (DMSO), which is toxic to cells at room temperature and upon extended exposure if not frozen at cryogenic temperature ($\leq -150°$ C.).

After the cryogenic freezing bag has been frozen at cryogenic temperature, the freezing bag becomes brittle. This brittleness of the freezing bag when frozen makes it important to remove large pockets of air from the bag before cryopreservation to avoid bag breakage. The presence of air pockets in the bag after cryopreservation increases the risk of frozen bag breakage if slight pressure is applied over the air pocket when handling the frozen bag for inspection in preparation for product release for thawing and infusion. In a case of a bag breakage, a vital unreplaceable product may be lost, directly impacting patient care.

Therefore, by more efficiently and effectively removing gas from the cryogenic freezing bag, cell viability can be increased.

Figure 1:
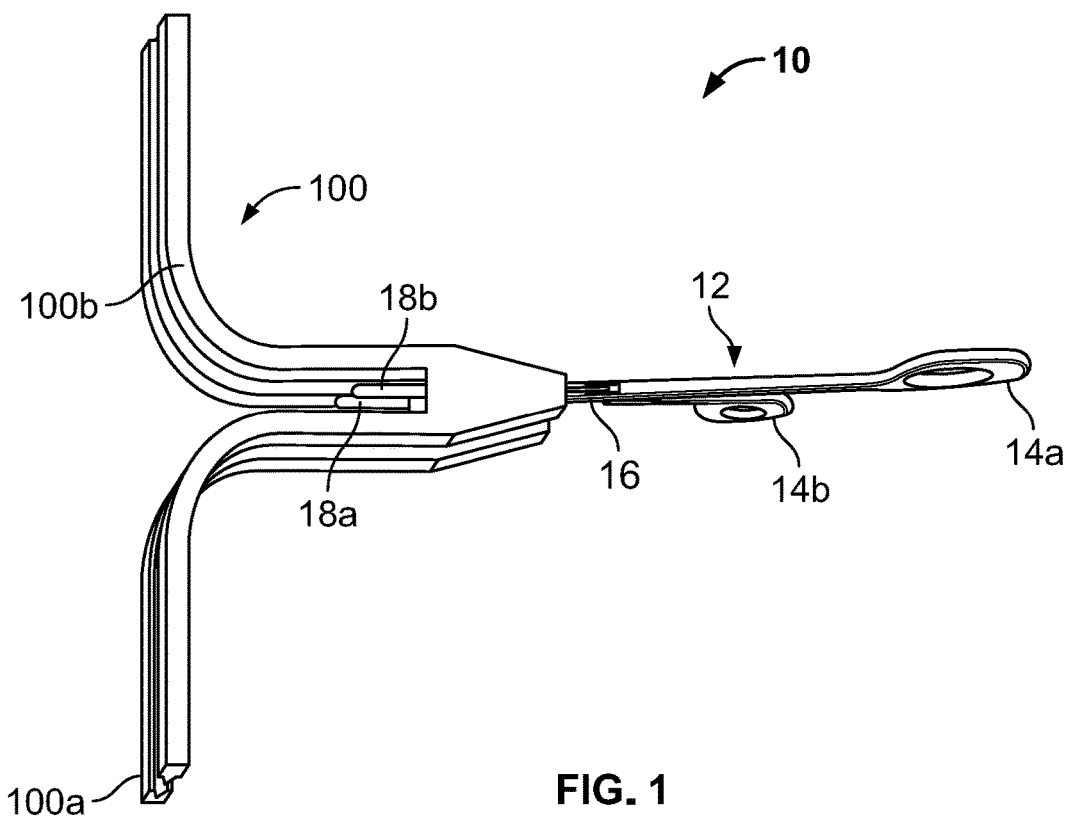
FIG. 1 is side view of a clamping device in accordance with some embodiments provided herein.
Figure 2:
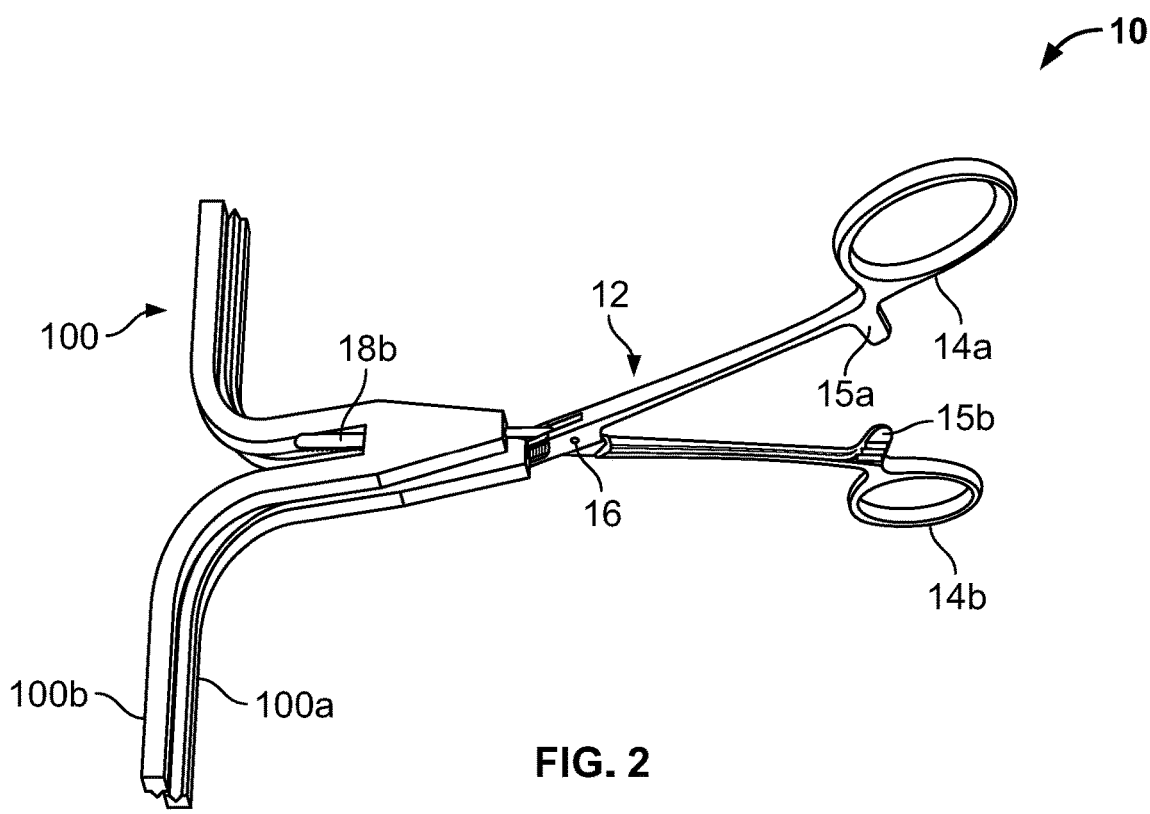
FIG. 2 is a perspective view of the clamping device of FIG. 1, in accordance with some embodiments provided herein.
Figure 3:
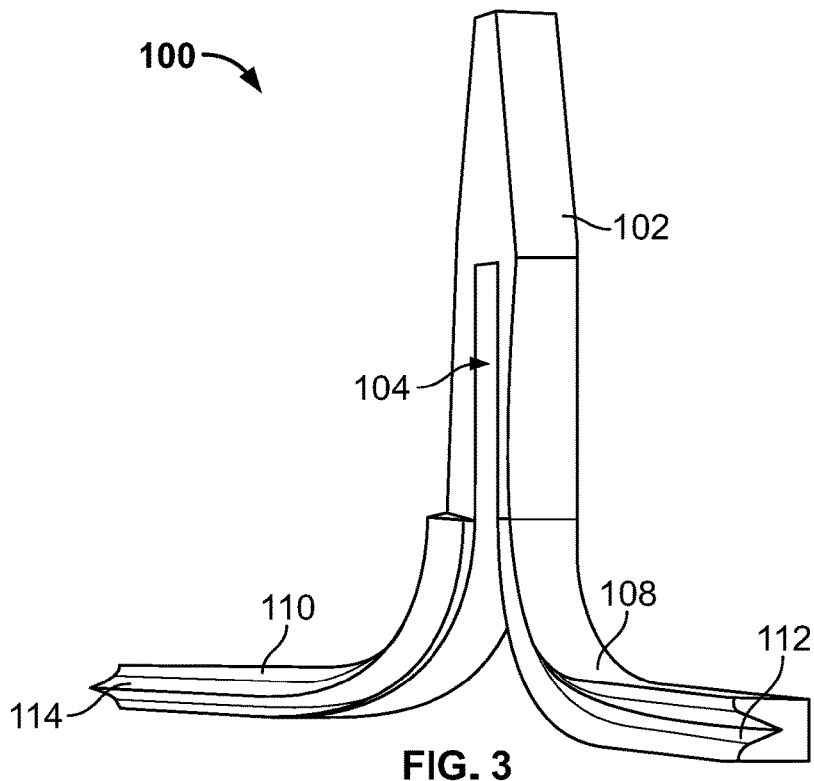
FIG. 3 is a perspective view of a clamp element of FIGS. 1 and 2, in accordance with some embodiments provided herein.
Figure 4:
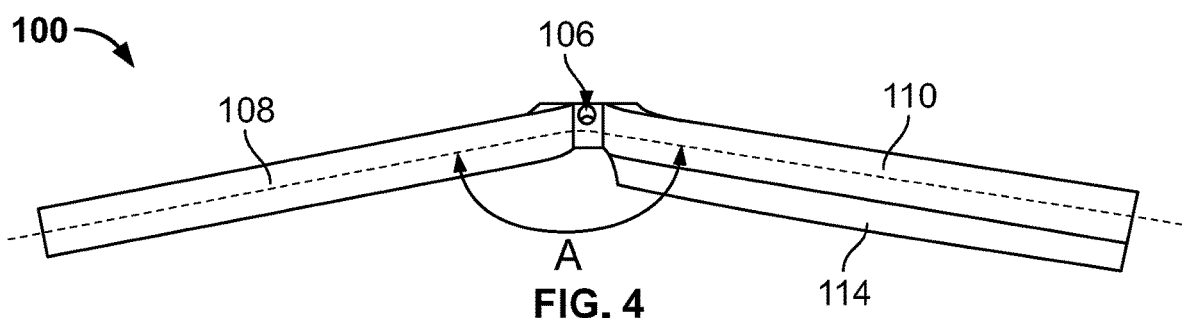
FIG. 4 is a bottom view of the clamp element of FIGS. 1 and 2, in accordance with some embodiments provided herein.
Figure 5:
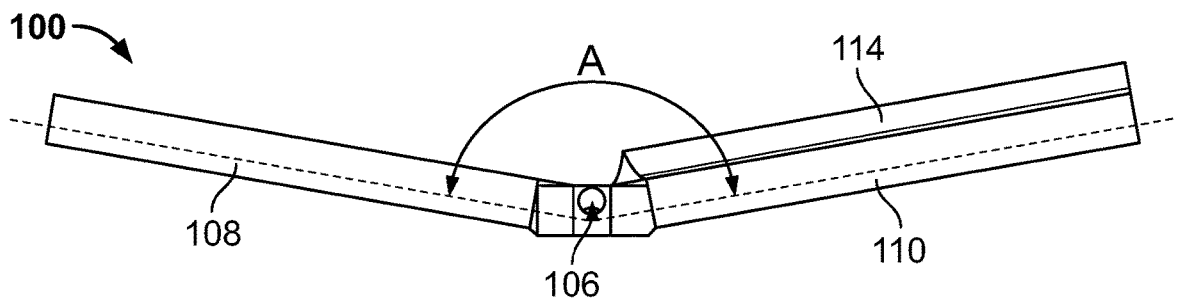
FIG. 5 is a top view of the clamp element of FIGS. 1 and 2, in accordance with some embodiments provided herein.
Figure 6:
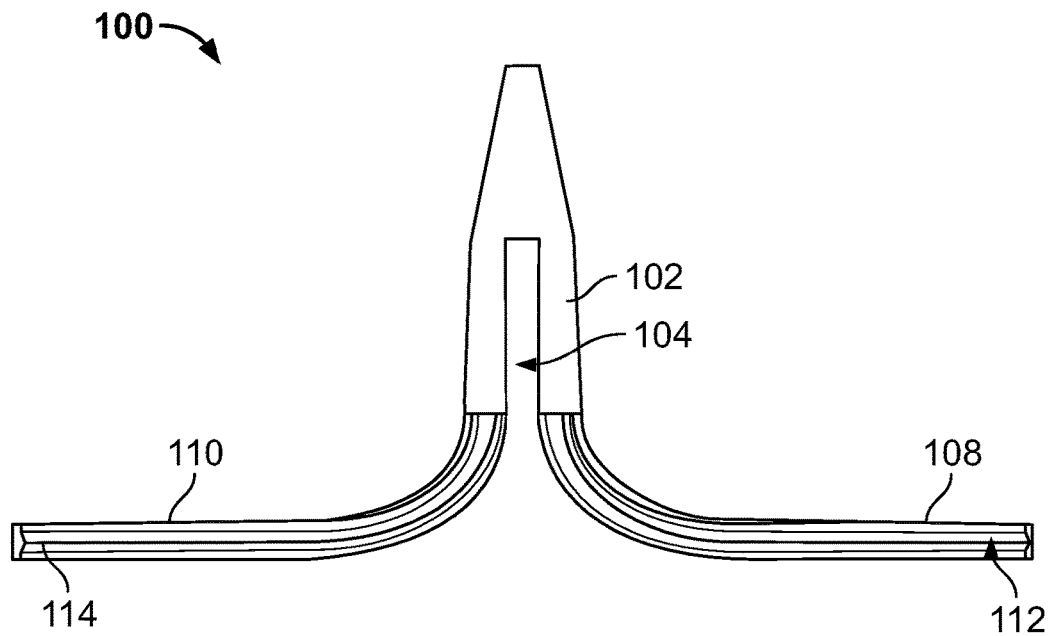
FIG. 6 is a front view of the clamp element of FIGS. 1 and 2, in accordance with some embodiments provided herein.
Figure 7:
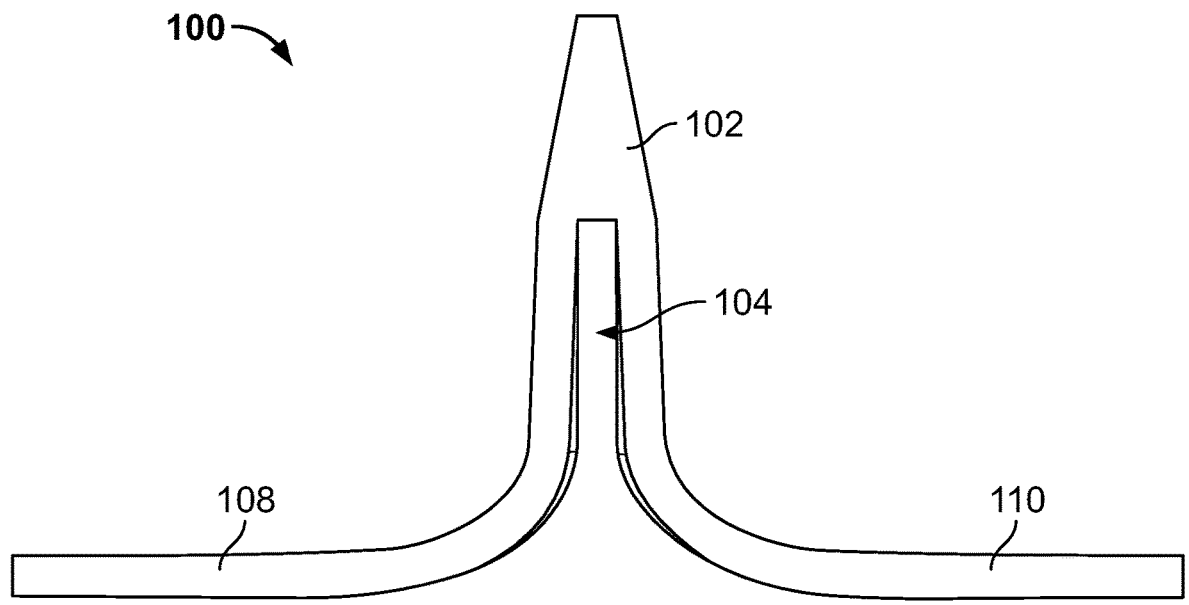
FIG. 7 is a back view of the clamp element of FIGS. 1 and 2, in accordance with some embodiments provided herein.
Figure 9:
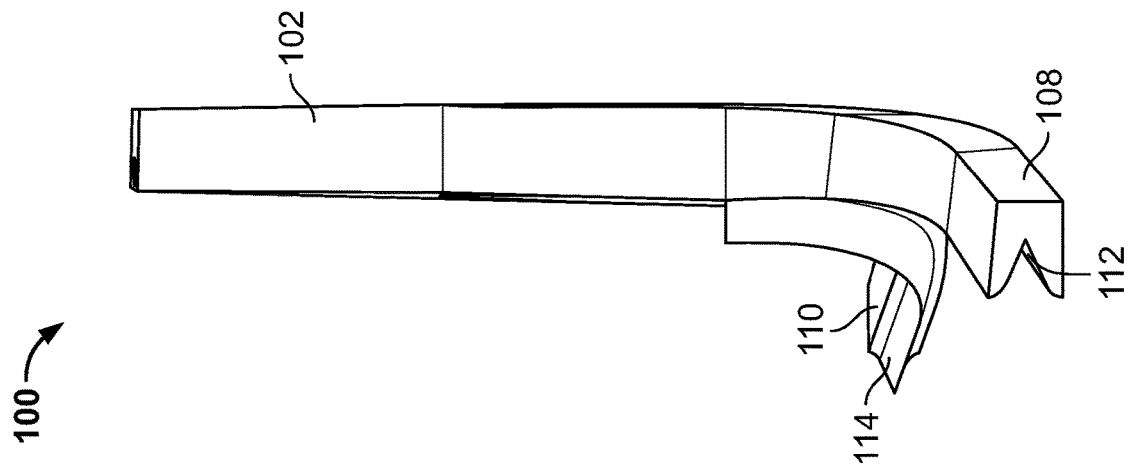
FIG. 9 is a second view of the clamp element of FIGS. 1 and 2, in accordance with some embodiments provided herein.
Figure 8:
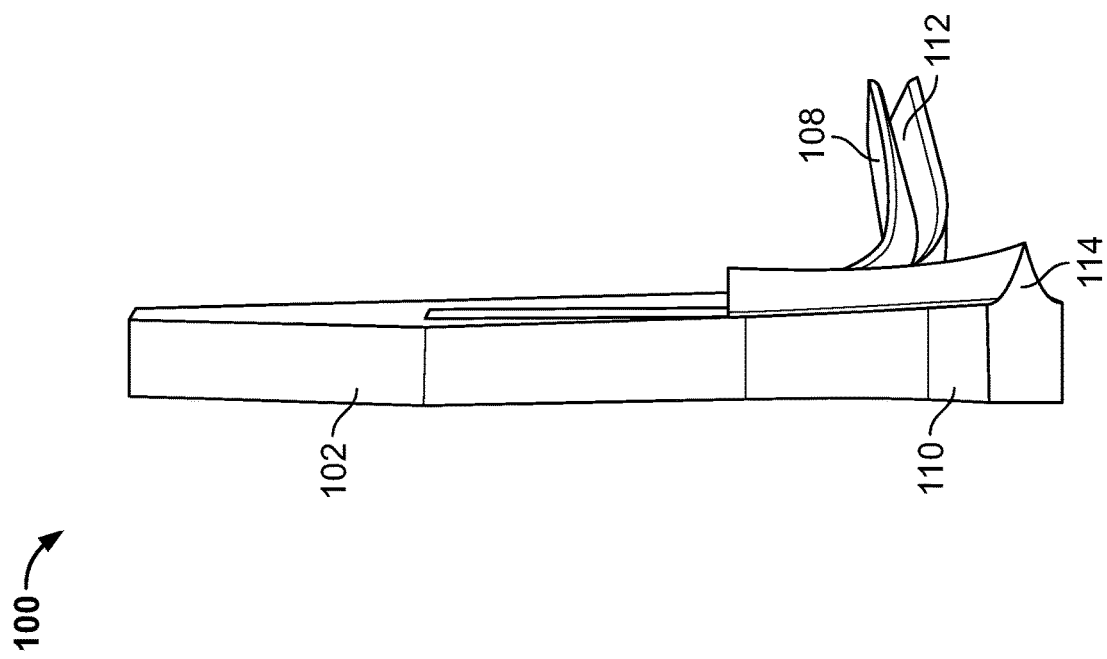
FIG. 8 is a first side view of the clamp element of FIGS. 1 and 2, in accordance with some embodiments provided herein.

Referring to FIGS. 1 and 2, a clamping device 10 can include a clamp element 100 coupled to a hemostat 12.

Hemostat 12 can include a set of handles 14a and 14b that a user can use to grip hemostat 12 that extend to tips 18a and 18b, respectively. Handles 14a and 14b, are coupled together via a pivot 16, such that actuation of handles 14a and 14b causes actuation of tips 18a and 18b. In some cases, handles 14a and 14b can include a locking mechanism 15a and 15b that allows the user to adjust the clamping force of the hemostat 12. For example, the locking mechanism 15a and 15b can be a series of interlocking teeth.

Clamp element 100 can include two clamp elements 100a and 100b. In some cases, clamp elements 100a and 100b can be removably coupled to tips 18a and 18b of hemostat 12. In some cases, clamp elements 100a and 100b can be substantially identical, such that a single design for clamp element 100 can be used for both clamp elements. Such a configuration can increase ease of use. In some cases, clamp elements 100a and 100b can be single use, disposable pieces. In some cases, clamp elements 100a and 100b are disposable, while hemostat 12 is reusable. In some cases, clamp elements 100a and 100b are reusable. In some cases, clamp elements 100a and 100b can be integral with hemostat 12. For example, a clamping device can include a handle, a pivoting mechanism, and a clamping portion opposite the handle.

Referring to FIGS. 3-9, the clamp element 100 can include a coupling portion 102, a first side arm 108, and a second side arm 110.

Coupling portion 102 can define a central opening 104 along a distal portion, and a coupling aperture 106 on a proximal portion. Central opening 104 can provide access for a tube extending from a cryogenic freezing bag, such that the tube is not clamped to allow for removal of gas. Coupling aperture 106 can couple clamp element 100 to hemostat 12 (shown in FIGS. 1 and 2). In some cases, aperture 106 can extend all the way through coupling portion 102 to central opening 104. In some cases, aperture 106 can extend partially through coupling portion 102. In some cases, aperture 106 can extend through coupling portion 102 at an angle offset from a longitudinal axis of the coupling portion 102. In some cases, the angle of aperture 106 can aid in clamping a cryogenic freezing bag. Optionally, aperture 106 can include a grip material, or texture, to aid in coupling and/or locking clamp element 100 to a hemostat 12. In some cases, aperture 106 can include a stopping mechanism. In some cases, when coupling clamp element 100 to hemostat 12, clamp element 100 can be pushed onto hemostat 12 until a stopping point is reached, such as stopping mechanism.

First side arm 108 and second side arm 110 can include extend outwardly from coupling portion 102 in substantially opposite directions (e.g., approximately 180 degrees from one another). In some cases, first side arm 108 and second side arm 110 can extend outwardly from coupling portion 102 in different directions, such that an angle A is defined between first side arm 108 and second side arm 110. Angle A can be about 110 degrees to about 180 degrees. In some cases, first side arm 108 and second side arm 110 can extend away from coupling portion 102 such that first side arm 108 and second side arm 110 curve away from coupling portion 102. In some cases, first side arm 108 and second side arm 110 are curved along a length of first side arm 108 and second side arm 110. In some cases, first side arm 108 and second side arm 110 can have a "birdwing" shape.

First side arm 108 can define a recess 112, and second side arm 110 can define a protrusion 114 that is complementary to recess 112. For example, protrusion 114 is complementary to recess 112 such that a recess 112 and protrusion 114 of a first clamp element 100a can mate to a protrusion 114 and a recess 112 of a second clamp element 100b. In some cases, protrusion 114 and recess 112 can couple to create a seal. In some cases, angle A between first side arm 108 and second side arm 110 provides a first clamp element 100a and a second clamp element 100b that are substantially identical while allowing a recess 112 and protrusion 114 of a first clamp element 100a to mate with a protrusion 114 and a recess 112 of a second clamp element 100b.

Recess 112 and protrusion 114 can be triangular, circular, rectangular, oblong, or other complementary shape with one another. In some cases, first side arm 108 and second side arm 110 can be made of a first material (e.g., a substantially rigid plastic), while protrusion 114 and a portion of first arm 108 that defines recess 112 can be made of a second material (e.g., rubber, silicone, etc.).

In some cases, clamp element 100 can include a locking mechanism. For example, a locking mechanism can lock a first clamp element 100a to a second clamp element 100b. In some cases, the locking mechanism can aid in preventing movement of the clamp elements 100a and 100b when clamped on a cryogenic freezing bag.

In some cases, a specific orientation and/or arrangement of coupling portion 102, first side arm 108, and second side arm 110 can be different than shown in FIGS. 3-9 to allow for clamping of a cryogenic bag with a different shape and/or configuration.

Referring to FIGS. 10A-10D, a method of using a clamping device 10 with a cryogenic freezing bag 20 is shown. In some cases, cryogenic freezing bag 20 can include a chamber 22, a tube 24, and one or more spike ports 26a and 26b. Chamber 22 can house a sample and/or a cryoprotectant. Tube 24 can be coupled to a syringe 28 to aid in the removal of gas from cryogenic freezing bag 20. Spike ports 26a and 26b can be used to introduce and/or remove a sample and/or a cryoprotectant.

As shown in FIG. 10A, cryogenic freezing bag 20 can be inverted, such that a sample 22a inside chamber 22 moves toward spike ports 26a and 26b, and tube 24. Clamping device 10 can be clamped to cryogenic freezing bag 20. In some cases, cryogenic freezing bag 20 is tapped (e.g., with a finger of a user) in order to remove gas from spike ports 26a and 26b, prior to clamping. In some cases, first side arm 108 and second side arm 110 of first and second clamp elements 100a and 100b can extend around spike ports 26a and 26b creating a seal between spike ports 26a and 26b and chamber 22. In some cases, tube 24 can extend through central opening 104 of first and second clamp elements 100a and 100b, such that tube 24 remains fluidly coupled to chamber 22. In some cases, clamping device 10 can be locked to maintain the clamped position (e.g., via a locking mechanism 15a and 15b on hemostat 12, as shown in FIG. 2, and/or via a locking mechanism on clamp elements 100a and 100b).

As shown in FIG. 10B, clamping device 10 is clamped on cryogenic freezing bag 20 and cryogenic freezing bag 20 is turned right side up, such that sample 22a in chamber 22 is moved away from spike ports 26a and 26b, and tube 24. In some cases, hemostat 12 can be hung from a stand (e.g., by handles 14a and 14b) to allow a user to use both hands to manipulate cryogenic freezing bag 20.

Figure 10C:
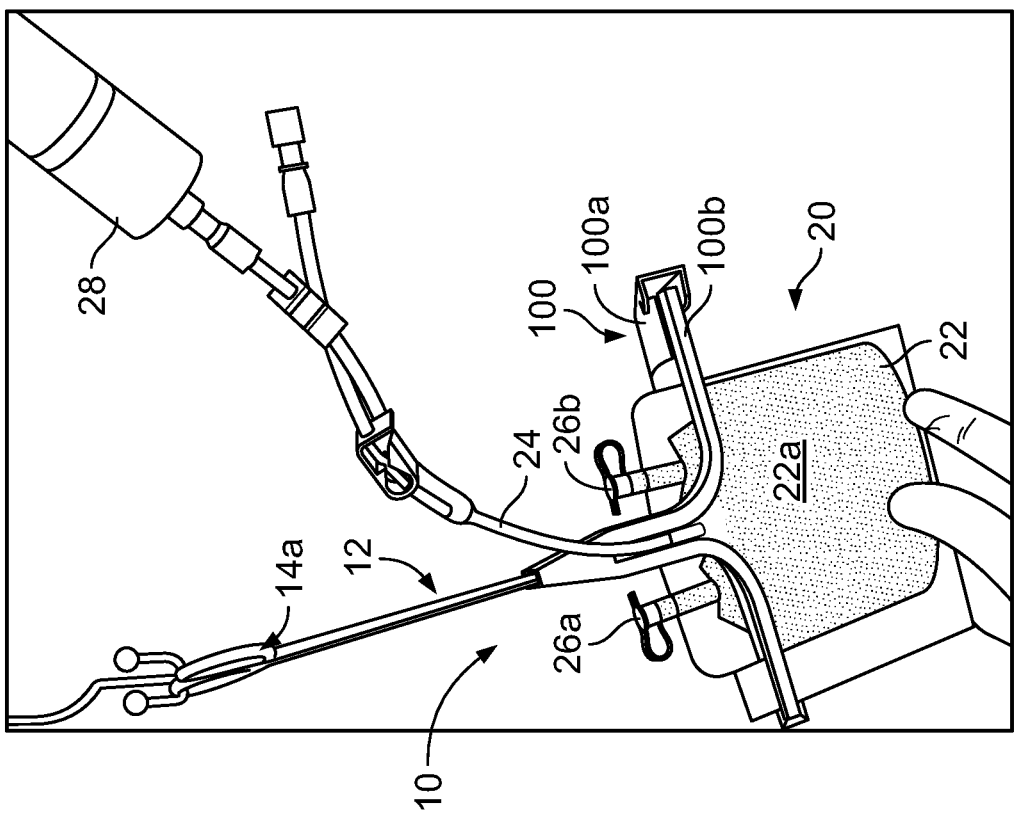

As shown in FIG. 10C, cryogenic freezing bag 20 can be manipulated by a user with one hand while removing gas from the cryogenic freezing bag 20 using syringe 28.

Figure 10D:
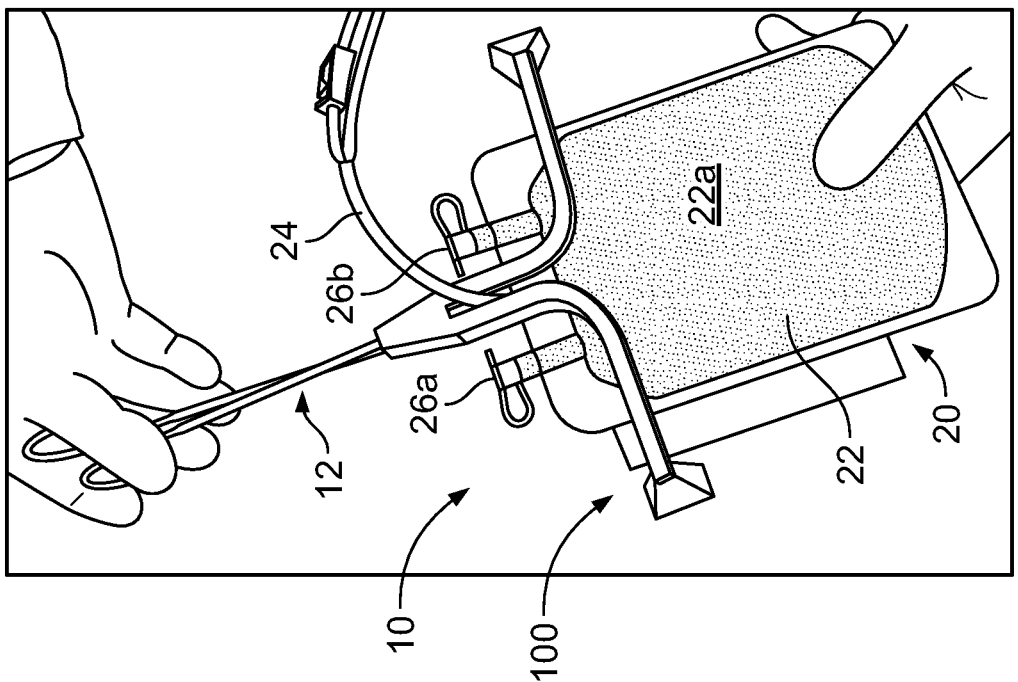

As shown in FIG. 10D, gas has been removed from cryogenic freezing bag 20, and cryogenic freezing bag 20 can be prepped for placement in a cryogenic freezer. For example, tube 24 can be sealed and cut.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the process depicted in the accompanying figures do not necessarily require the particular order shown, or sequential order, to achieve desirable results. In certain implementations, multitasking and parallel processing may be advantageous.

What is claimed is:

1. A method of removing a gas from a cryogenic freezing bag, comprising:
   removably coupling a first clamping element of a clamping device to a first tip of a hemostat of the clamping device;
   removably coupling a second clamping element of the clamping device to a second tip of the hemostat of the clamping device;
   clamping the clamping device on the cryogenic freezing bag; and
   removing the gas from the cryogenic freezing bag through an opening defined by the cryogenic freezing bag.

2. The method of claim 1, wherein removably coupling the first and second clamping elements to the first and second tips of the hemostat comprises: i) removably coupling a first coupling aperture to the first tip of the hemostat, and ii) removably coupling a second coupling aperture to the second tip of the hemostat, the first coupling aperture defined by a first coupling portion of the first clamping element, and the second coupling aperture defined by a second coupling portion of the second clamping element.

3. The method of claim 2, wherein the opening is a central opening and clamping the clamping device on the cryogenic freezing bag comprises sealing a first opening of the cryogenic freezing bag.

4. The method of claim 3, wherein the first opening is a spike port of the cryogenic freezing bag.

5. The method of claim 3, further comprising moving a sample within a chamber of the cryogenic freezing bag toward the first opening by inverting the cryogenic freezing bag prior to clamping the clamping device on the cryogenic freezing bag.

6. The method of claim 3, wherein sealing the first opening of the cryogenic freezing bag comprises extending a first side arm of the first clamping element and a third side arm of the second clamping element around the first opening, the first side arm extending from the first coupling portion in a first direction, and the third side arm extending from the second coupling portion in a third direction.

7. The method of claim 6, wherein clamping the clamping device on the cryogenic freezing bag comprises mating a second protrusion defined by the third side arm with a first recess defined by the first side arm.

8. The method of claim 7, wherein clamping the clamping device on the cryogenic freezing bag comprises sealing a second opening of the cryogenic freezing bag.

9. The method of claim 8, wherein sealing the second opening of the cryogenic freezing bag comprises extending a second side arm of the first clamping element and a fourth side arm of the second clamping element around the second opening, the second side arm extending from the first coupling portion in a second direction, and the fourth side arm extending from the second coupling portion in a fourth direction.

10. The method of claim 9, wherein clamping the clamping device on the cryogenic freezing bag comprises mating a first protrusion defined by the second side arm with a second recess defined by the fourth side arm.

11. The method of claim 10, further comprising mating of the first protrusion with the second recess and the second protrusion with the first recess by moving a first handle defined by the first coupling portion towards a second handle defined by the second coupling portion.

12. The method of claim 11, wherein moving the first handle towards the second handle comprises pivotally actuating the first and second coupling portions.

13. The method of claim 2, wherein the first clamping element and the second clamping element are pivotally coupled along the first and second coupling portions.

14. The method of claim 1, wherein removing the gas from the cryogenic freezing bag comprises using the opening to provide access for a tube in fluid connection with and extending from the cryogenic freezing bag.

15. The method of claim 14, wherein removing the gas from the cryogenic freezing bag comprises coupling a syringe to the tube to aid in the removal of the gas.

16. The method of claim 14, further comprising sealing the tube after removing the gas from the cryogenic freezing bag.

17. The method of claim 14, further comprising extending the tube through a central opening defined by a coupling portion at a distal end of the clamping device.

18. The method of claim 1, further comprising adjusting a clamping force of the clamping device by adjusting a locking mechanism of the hemostat.

19. The method of claim 18, further comprising locking the clamping device to maintain a clamped position by locking the locking mechanism of the hemostat.

20. The method of claim 1, further comprising hanging the cryogenic freezing bag by a handle of the clamping device after removing the gas from the cryogenic freezing bag.

* * * * *